April 7, 1970            R. H. AHRENS            3,505,580
MAGNETIC LINE FOLLOWER FOR AN X-Y MOTOR CONTROL
Filed Sept. 15, 1965            3 Sheets-Sheet 1
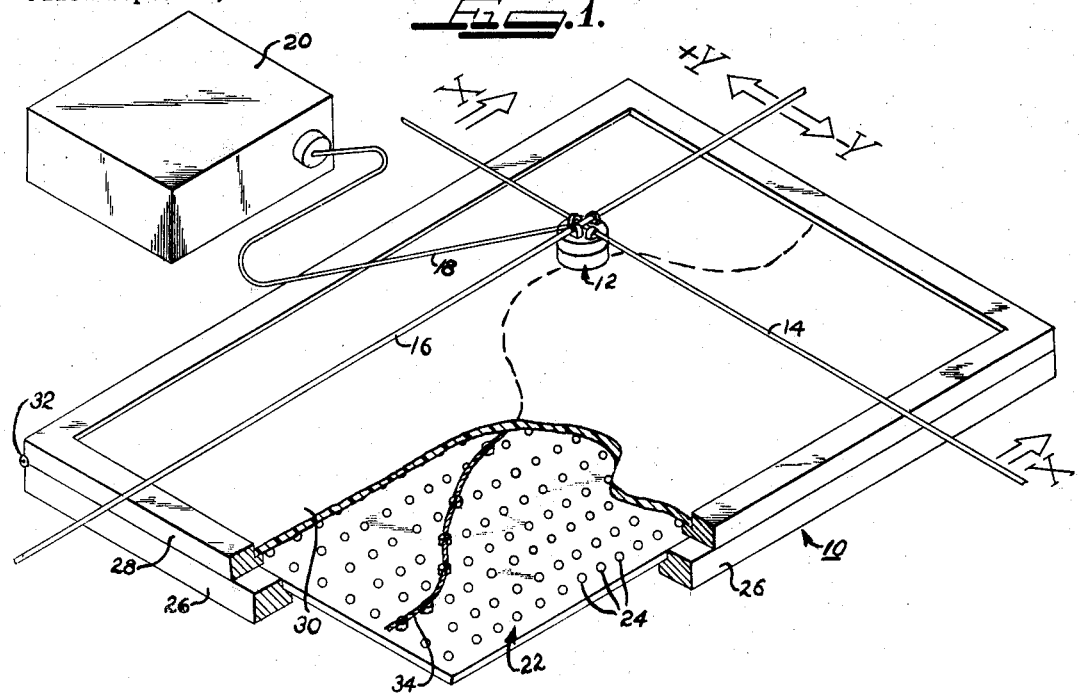
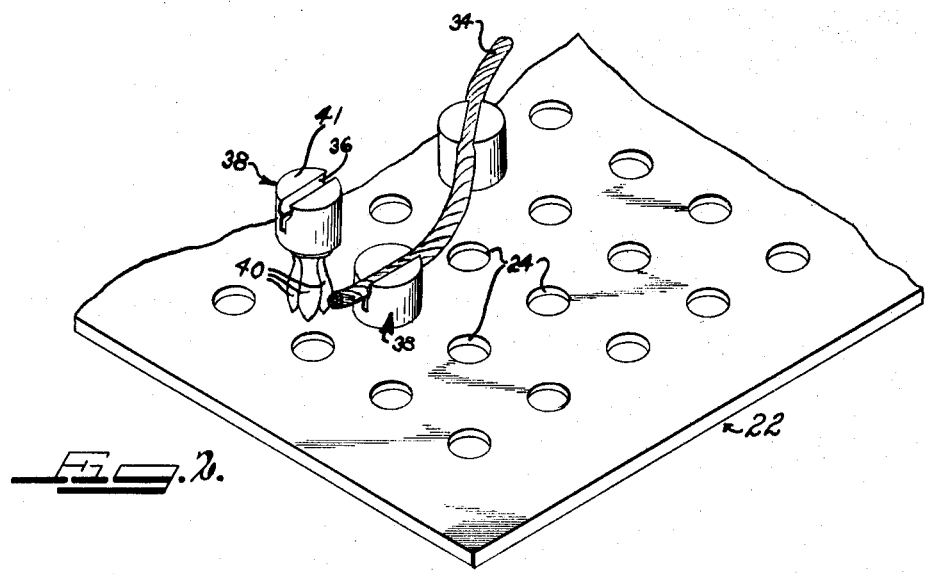
INVENTOR
ROBERT H. AHRENS
BY
*Fidler, Bradley & Patnaude*
Attys.

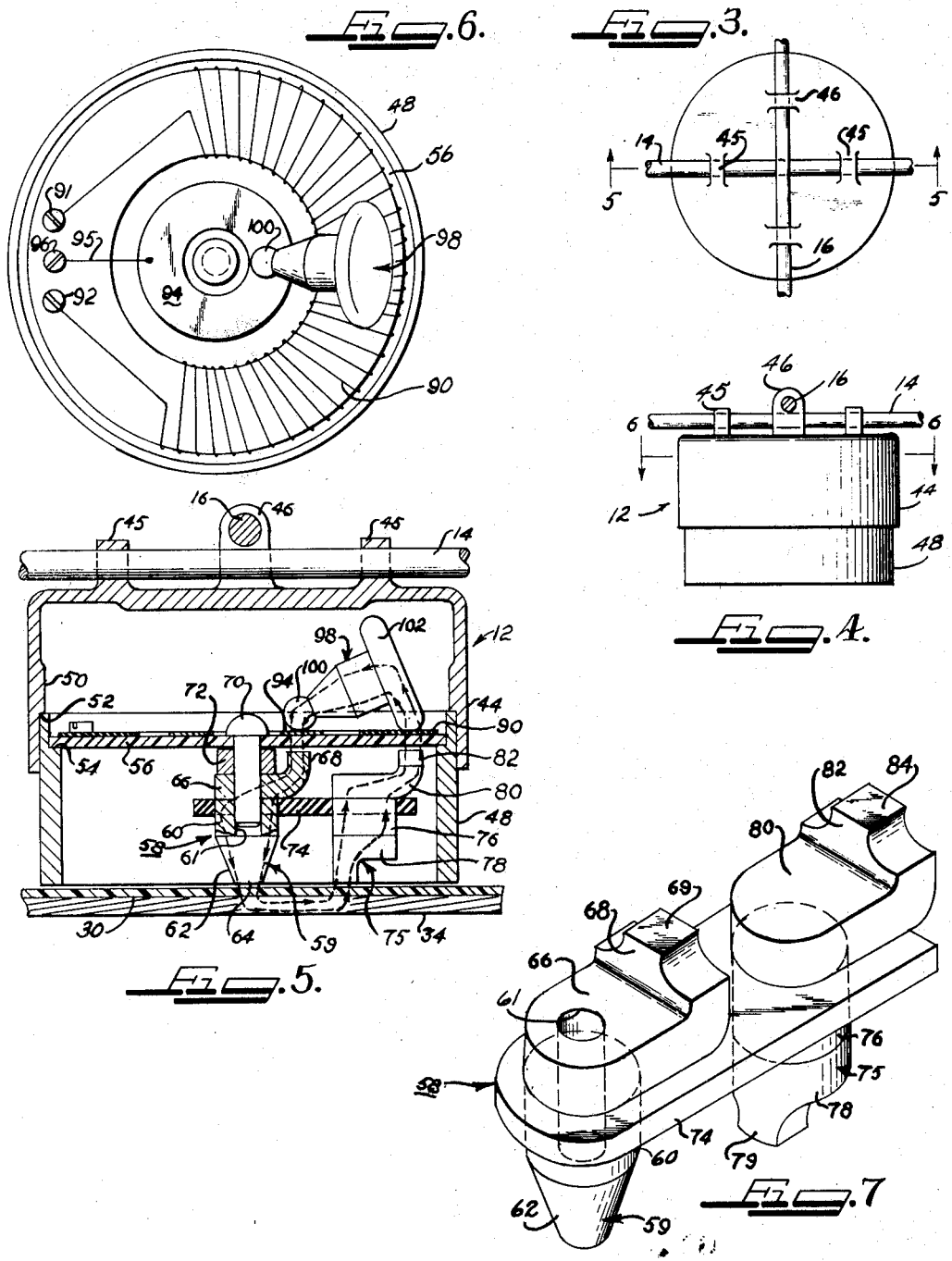

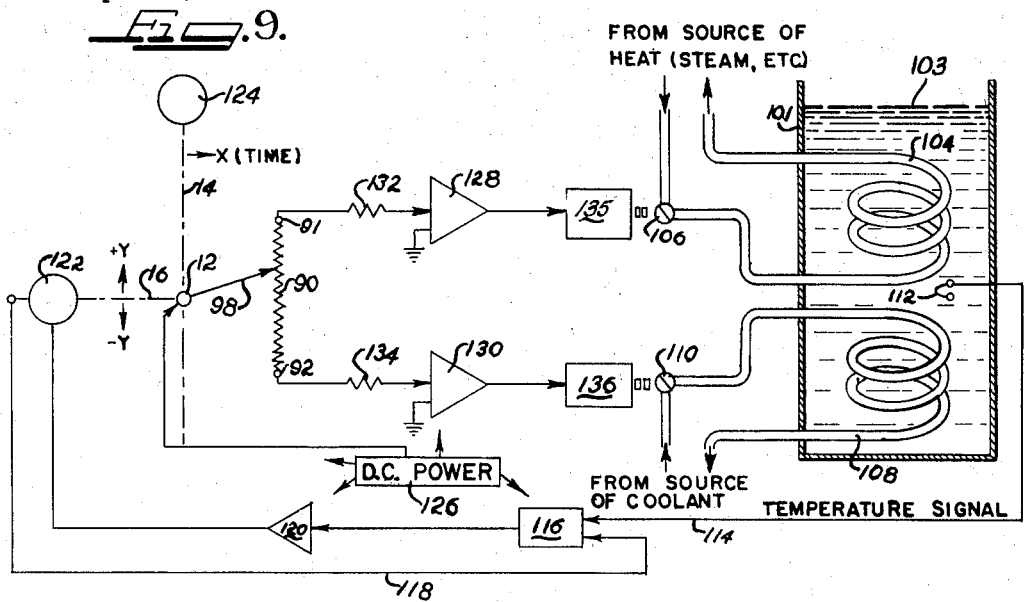
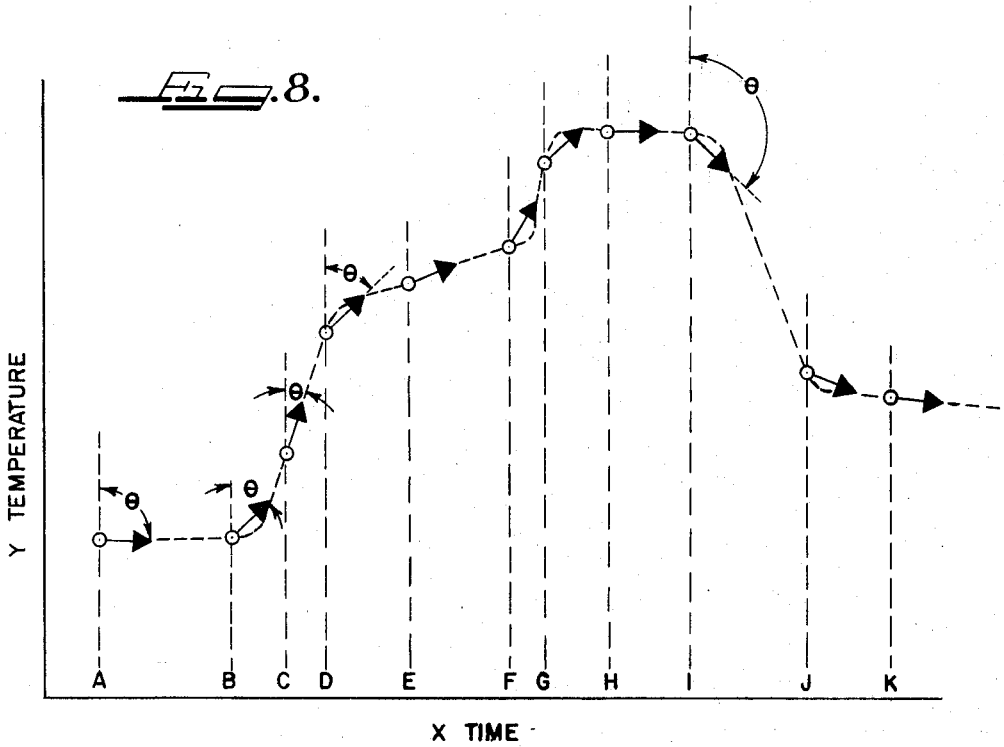

United States Patent Office 3,505,580
Patented Apr. 7, 1970

3,505,580
MAGNETIC LINE FOLLOWER FOR AN
X-Y MOTOR CONTROL
Robert H. Ahrens, Milwaukee, Wis., assignor to
Milwaukee Chaplet & Mfg. Company, Inc.
Filed Sept. 15, 1965, Ser. No. 487,468
Int. Cl. G05b 19/02
U.S. Cl. 318—162
19 Claims

ABSTRACT OF THE DISCLOSURE

A curve defining a desired relationship between variables is established by pressing a flexible cable of magnetic material into slots of non-magnetic pegs selectively located in holes representing points on a plot sheet covered by a planar panel. A reading device actuated across the panel contains magnetic polar elements relatively rotatable about a predetermined axis normal to the panel, one such element registering with the axis and the other being radially offset therefrom. The respective elements are attracted to the cable, which completes a flux path between them, causing the offset element to rotate about the axis to follow the path determined by the cable. Changes in relative position of the elements are communicated magnetically through polarized arms of said elements to an armature which is a rolling electrical contactor riding over fixed resistor contacts in a separate closed chamber to control an electrical current which is a function of the relative positions of the elements and which operates servo motors to maintain the elements on a path defined by the cable.

The present invention relates generally to controllers, and it relates more particularly to a closed loop control system and associated apparatus for controlling one variable in relation to an independent variable in accordance with a predetermined functional relationship between the variables.

In order to maintain a plurality of variables in a predetermined relationship, two basic types of systems are known in the prior art. One of these is an open loop system and the other is a closed loop system. The open loop systems are generally of the analog type wherein a control signal is generated as a function of one of the variables. As one example of such an open loop system, a cam is provided having a contour shape conforming with the curve representing the desired relationship between the variables, and the cam is moved relative to a cam follower in response to changes in one of the variables thereby to generate a control signal proportional to the desired value of the other variable. A principal disadvantage of such a system is, therefore, that it fails to take into consideration the actual value of the controlled variable and thus fails to provide a signal which compensates for any existing error in the controlled variable. Some open loop systems have incorporated additional error compensation circuitry but this necessarily results in an increase in the costs of manufacturing and maintaining the system.

The closed loop systems of the prior art do provide for error compensation and thus generate an error or control signal which is proportional to the difference between the actual value of the controlled variable and its desired value as determined by the existing value of the independent variable. Closed loop systems have usually included a complex servo system together with a computorized time-base reference. As a result, the prior art closed loop systems are expensive, and require electronic technicians having a relatively high skill level in order to maintain, adjust, and calibrate such systems. These prior art closed loop systems have the added disadvantage that they do not inherently provide an anticipatory control signal and, consequently, they do not compensate for the inherent response time lag in the associated system.

Therefore, a principal object of the present invention is to provide a new and improved controller and control system for maintaining a plurality of variables in a predetermined relationship.

Another object of the present invention is to provide a new and improved closed loop control system.

Still another object of the present invention is to provide a closed loop control system for generating a control or error signal including a component which is proportional to an anticipated change in the controlled variable thereby to compensate for the natural time lag in the system.

A further object of the present invention is to provide new and improved apparatus for generating an error control signal in response to a plurality of variables.

A still further object of the present invention is to provide a new and improved X-Y plotter and associated curve follower.

A yet further object of the present invention is to provide a new and improved magnetic curve follower for generating an electric signal proportional to the difference between the actual value of a variable and a desired value of such variable.

Briefly, the above and further objects are realized with one feature of the present invention by providing a function controller and control system employing means for setting up a curve representative of the desired relationship between two variables and for following such curve in response to changes in the value of the variables to develop an error signal for controlling one of the variables thereby to maintain said variables in the relationship represented by the curve. The control signal so developed is proportional to the difference between the value of the controlled variable and the desired value thereof at a future time. The control signal is thus anticipatory in nature and may be adjusted to compensate for the inherent time lag in the system, whereby the two variables can be accurately maintained in the desired predetermined relationship at all times.

In order to derive the control signal heretofore described, there is provided in accordance with another feature of the present invention a new and improved X-Y plotter and magnetic curve follower in which a flexible, magnetic, cord-like member is adapted to be arranged in the shape of the desired function curve, and the follower is made to follow the magnetic cord in response to changes in the two variables and to develop an electric error signal proportional to the difference between the actual value of one of the variables and the desired value thereof.

Further objects and advantages and a better understanding of the present invention may be had by reference to the following detailed description thereof taken in connection with the accompanying drawings, in which:

FIG. 1 is an isometric view, partly broken away, of an X-Y plotter and associated curve follower embodying certain features of the invention;

FIG. 2 is an enlarged, fragmentary view of a portion of the plotter shown in FIG. 1;

FIG. 3 is a top plan view of the magnetic curve follower incorporated in the device of FIG. 1;

FIG. 4 is a side elevational view of the magnetic curve follower incorporated in the device of FIG. 1;

FIG. 5 is a cross-sectional view taken along the line 5—5 of FIG. 3;

FIG. 6 is a cross-sectional view taken along the line 6—6 of FIG. 4;

FIG. 7 is an enlarged isometric view of a portion of the magnetic curve follower of FIG. 5;

FIG. 8 is a graph showing a function curve defining the relationship between a pair of variables, which curve is useful in understanding the operation of the present invention; and FIG. 9 is a schematic diagram of a control system embodying the present invention.

Referring now to the drawings, and more particularly to FIG. 1 thereof, there is shown an X–Y plotter 10 and a magnetic follower unit 12 slidably mounted on a pair of transverse drive rods 14 and 16 which are suitably driven in directions transverse to the respective longitudinal axes thereof so that the rods 14 and 16 cross at a point representative of the instantaneous values of the associated X–Y variables. There are several well known devices for driving the rods 14 and 16 in this manner and, therefore, in order to facilitate an understanding of the present invention such devices are not shown in the drawings nor are they described in detail in this specification. An electric cable 18 connects the electrical components of the follower 12 with suitable control circuits mounted in a control cabinet 20, which circuits are shown in greater detail in FIG. 9 and described hereinafter in connection with such figure.

The X–Y plotter 10 of the present invention includes a flat sheet 22 of non-magnetic material having a plurality of circular holes 24 therein arranged in a plurality of horizontal and vertical rows. The perforated sheet 22 is fixedly mounted in a rigid rectangular frame 26. A second frame 28 in which is mounted a thin cover sheet 30 of non-magnetic material is secured to the frame 26 by means of one or more hinges 32 extending along one side of the respective frames 26 and 28. The cover sheet 30 may be conveniently made of plastic and should be sufficiently self-supporting so as to maintain a planar shape.

In order to plot the function curve representing the desired relationship between the variables X and Y, a flexible cable 34, formed of magnetic material, is pressed into cable receiving slots 36, best shown in FIG. 2, in the top of a plurality of plastic or other non-magnetic pegs 38 which are in turn pressed into the appropriate ones of the holes 24 in the sheet 22. As will become apparent as the description proceeds, the cable 34 may in itself be a permanent magnet polarized from one end to the other. Considered in greater detail, each of the pegs 38 is provided with a plurality of resilient prongs or fingers 40 which, when compressed together, fit tightly into the selected one of the holes 24 so as to maintain the respective peg in a position of fixed orientation within the associated hole 24. It may thus be seen that the selection of the proper number and location of the pegs 38 enables the plotting of a desired two-dimensional curve by means of the flexible cable 34. Also, the slots 36 are so shaped that the upper surface of that portion of the cable 34 which extends therethrough lies flush with the top flat surface 41 of the associated peg. When the cover frame 28 is closed, as shown in FIG. 1, the cover sheet 30 rests directly on the top of the plugs 38 and is also, therefore, engaged by the upper surface of the magnetic cable 34. It will be understood that other means for securing the plugs 38 to the sheet 22 such, for example, as threaded connections, may be employed if desired for a particular application.

As noted hereinbefore, the driving means or actuators for the control rods 14 and 16 are well known in the art and will vary according to the application, but such driving elements may be servo-motors which are energized to drive the rods 14 and 16 in accordance with the instantaneous values of the variables X and Y. When such values have the relationship represented by the curve of the cable 34, the follower unit 12 will be positioned with the intersection of the rods 14 and 16 directly over the cable 34. The follower unit 12 and the associated circuitry function to maintain the values of the variables X and Y in this predetermined relationship in the manner described hereinafter.

Referring now to FIGURES 3 through 7, the follower unit 12 is generally cylindrical in shape and comprises an inverted cup-shaped cap member 44 having a first pair of apertured upstanding lugs 45 for loosely receiving the control rod 14 and a second pair of upstanding apertured lugs 46 for slidably receiving the control rod 16. It will be noted that the lugs 46 are apertured at a location above the rod 14 so that the rods 14 and 16 do not interfere with one another or with the free movement of the follower unit 12 therealong. It will be apparent that as the control rod 16, for example, as shown in FIG. 3, is moved to the left by the associated driving means that the follower 12 will slide to the left along the control rod 14. Movement of the control rod 14 by its associated drive means similarly results in sliding the follower 12 in the corresponding direction along the control rod 16. The cup-shaped housing member 44 thus functions to position the principal axis of the follower 12 along the line intersecting the longitudinal axes of the rods 14 and 16. In addition, the housing member 44 maintains the follower 12 in a fixed attitude and angular orientation at all positions thereof relative to the X–Y plotter.

The internal elements of the follower 12 are supported by a non-magnetic sleeve 48 which is suitably secured as by press-fitting into the lower end of the cup-shaped member 44. To facilitate an accurate assembly of the parts 44 and 48, an internal annular flange 50 is formed in the cup-shaped member 44 to provide a downwardly facing annular shoulder 52 functioning as a stop against which the upper edge of the sleeve 48 abuts when the parts are in assembled relationship.

A rabbet 54 is provided in the upper internal surface of the sleeve 48 and supports a thin disk 56 formed of a non-magnetic, electrically insulating material which rotatably supports a magnetic assembly 58, best shown in FIG. 7. The magnetic assembly 58 consists of a rear or pivot magnet assembly 59 incorporating a cylindrical permanent magnet 60 having a bore 61 extending along the axis of polarization thereof, a magnetic member 62 of frusto-conical shape having a planar lower surface 64 and a planar upper surface engaging the lower side of the magnet 60, and a generally L-shaped magnetic member 66 having an aperture at one end aligned with the bore 60 and an upwardly extending end portion 68 having a planar surface 69 positioned a short distance below the disk 56 in parallel relationship therewith. The pivot magnet assembly 59 is rotatably mounted along the principal longitudinal axis of the follower 12 by means of a non-magnetic pintle member or pin 70 suitably mounted in fixed, sealing relationship to the disk 56 and extending through the respective bores in the elements 60 and 66. A non-magnetic spacer bushing 72 is disposed between the disk 56 and the L-shaped magnetic member 66 to provide proper spacing of the pivot magnet with respect to the associated housing and with respect to the other parts of the follower.

The cylindrical magnet 60 is press-fitted into a corresponding aperture in an arm 74 which is formed of a suitable rigid, non-magnetic material such, for example, as plastic. The arm 74 thus rotates in unison with the magnet 60 about the axis of the follower, which axis is transverse to the rods 14 and 16 and passes through the longitudinal axes thereof.

Mounted in a suitable hole in the plate 74 is a tracer magnetic assembly 75 comprising a cylindrically shaped permanent magnet 76 to the bottom of which is secured a generally L-shaped magnetic member 78 and to the top of which is secured another L-shaped magnetic member 80. It will be noted that the offset portions of the members 78 and 80 are symmertcially arranged in the same plane as the offset portion 68 of the L-shaped member 66 in the pivot magnet assembly. The upstanding portion of the magnetic member 80 is identified by the numeral 82 and has a flat, planar, upper surface 84 which lies in a coplanar position with the surface 69 on the pivot magnet assembly. Both the sufaces 69 and 84 are thus positioned in proximity to the lower surface of the disk 56. Moreover, the central vertical axes of the upstanding portions 68 and 82, the downwardly extending portion 79 and the frusto-conical magnetic member 62 all lie in a common plane. This plane is thus rotatable about the longitudinal axis of the pin 70 and thus about the principal longitudinal axis of the follower 12. Although for ease of fabrication, the pivot magnet assembly and the tracer magnetic assembly have each comprised a plurality of separate magnetic members, it will be understood that each entire assembly may be fabricated from a single permanent magnetic member without departing from the present invention. In either case, however, the magnetic assemblies 59 and 75 are polarized in opposite directions so that one presents a north pole and the other a south pole to the cable 34.

As thus far described, it may be seen that the magnetic force of attraction between the magnetic assemblies and the cable 34 will cause the tracer and pivot magnet assemblies to be positioned in line with the cable 34 so as to maintain a minimum reluctance in the magnetic circuit. Accordingly, the angular position of the overall magnetic assembly 58 corresponds to the slope of the curve represented by the cable 34. This, of course, presupposes that the drive rods 14 and 16 are positioned to cross at a point directly above the cable 34.

In order to derive an electric signal corresponding to the angular position of the magnet assembly 58, there is provided on the upper surface of the disk 56 a flat wound, resistance coil 90, the opposite ends of which are connected to a pair of contact terminals 91 and 92. A flat conductive ring or annulus 94 is also mounted on the disk 56 in spaced apart insulated relationship from the resistance winding 90. The ring 94 is connected by a suitable conductor 95 to a common contact terminal 96.

Freely mounted on top of the disk 56 above the winding 90 and the common ring 94 is a permanent magnet wiper member 98 polarized along its principal axis and which is also a good electric conductor. The member 98 has a generally spherical end portion 100 adapted to roll on and engage the ring 94 directly above the upstanding portion 68 of the pivot magnet assembly 59. The member 98 also has a circular portion 102 adapted to roll on and engage the resistance element 90 directly above the upstanding portion 82 of the tracer magnet assembly. The wiper member 98 is preferably plated with a conductive coating such, for example, as a gold flashed on silver plating to improve the electrical conductivity and to minimize any possible oxidation thereof. The wiper member 98 thus serves to complete the magnet path between the tracer and the pivot magnet assemblies and also to provide an electric connection between a selected position on the resistance element 90 and the ring 94. Accordingly, the value of the resistance between the terminal 91 and the terminal 96 and the value of the resistance between the terminal 92 and the terminal 96 is dependent upon the position of the wiper 98 in the follower which in turn is dependent on the angular position of the tracer magnet assembly 75 relative to the pivot magnet assembly 59. An important advantage of this follower construction is that the electric circuit can be hermetically sealed where the system is used, for example in an explosive atmosphere.

As briefly described hereinabove, when the follower 12 is positioned directly over the magnetic cable 34, the magnet assembly 58 aligns itself with the cable in order to establish a flux path having a minimum amount of reluctance. Moreover, the wiper element 98 will roll about the resistance element 90 and the ring 94 to align itself with the magnet assembly 58 whereby the resistance values between the terminals 91 and 96 and between the terminals 92 and 96 will be related to the slope of the cable 34 at the location of the follower 12. More particularly, the resistance values will be representative of the slope of the cable between the location of the pivot magnet assembly 59 and the tracer magnet assembly 75. The distance between the respective axes of the pivot magnet assembly 58 and the tracer magnet assembly 75 thus determines the degree of anticipation provided by the controller. If this distance corresponds to the inherent time lag in the system, the pivot magnet assembly 58 will at all times be located directly above the cable 34.

Assume, for example, that the follower unit 12 is positioned at a Y value slightly higher than the cable, as shown in FIG 1. Accordingly, the pivot magnet assembly 59 is also located higher than the cable in the Y direction. The tracer magnet assembly 75 will, however, position itself directly over the cable 34 and the angular position of the overall assembly 58 will indicate a slope which is less in a positive sense than the actual slope of the curve represented by the cable 34. It may thus be seen that the error signal is not only proportional to the difference in actual and desired values of the Y variable, but it is proportional to what that difference will be in the future by a time equivalent to the response time lag in the process of operation.

In order to match the anticipation component of the error signal with the time lag in the controlled system, the distance between the magnet assemblies 59 and 75 may be physically varied by, for example, using a magnetic member 78 in which the depending portion 79 is closer or farther removed from the principal axis of the magnet assembly 59, or it may be adjusted by varying the gains of the amplifiers in the associated control circuits which receive signals from the follower and direct such signals to the actual load devices.

Refer now to FIGS. 8 and 9 for a better understanding of the operation of the overall controller embodying the several features of the present invention. In FIG. 8, there is illustrated a curve defining a relationship between two variables X and Y. In this case the X variable is time and the Y variable is temperature. The pegs 38 will be positioned at appropriate places along the curve so that the cable 34 representing the curve may be conveniently conformed to the desired shape.

In FIG. 9 there is shown a vessel 100 in which a liquid bath 103 is disposed. A heating coil 104 is submerged in the liquid bath and is controllably supplied with a heated fluid, such as steam, by means of an electrically controlled modulating valve 106. A cooling coil 108 is also submerged in the liquid bath and is supplied with a cooling fluid by means of an electrically controlled modulating valve 110. Accordingly, by opening the valve 106 the temperature of the liquid 103 is increased and by opening the valve 110 the temperature of the liquid 103 is cooled.

A temperature sensing device 112 such, for example, as a thermocouple, is immersed in liquid bath 103 and is connected by an electrical conductor 114 to a comparator circuit 116 wherein it is compared to a signal proportional to the Y value position of the follower unit 12. This latter signal may be generated by a potentiometer or similar device which is a part of the Y value servo positioner or other actuator on the X–Y plotter 10. This signal is coupled through a conductor 118 to one of the two inputs of the comparator circuit 116. An error signal proportional to the difference between the actual temperature of the liquid 103 and the position of the follower unit 12 along the Y axis of the X–Y plotter is generated in the comparator circuit 116, amplified by means of an amplifier 130 and used to drive a servo drive motor 122 which is connected to the rod 16 in the X–Y plotter. Accordingly, the follower unit 12 is driven along the Y axis by an amount proportional to the difference in the values of the signals respectively supplied by the conductors 114 and 118 to the comparator circuit 116. A drive motor 124 is continuously energized and thus drives the rod 14 at a constant speed in a positive direction along the axis thereby moving the follower unit 12 across the surface of the X–Y plotter at a velocity proportional to time. The motor 124 may be a synchronous motor in this particular application. Where, however, the X variable does not vary in proportion to time, the drive rod 14 would be driven by a suitable servo motor and associated control circuit.

The pick-off potentiometer 90 is shown schematically and is energized through its wiper element 98 from a D-C power supply 126. The terminal 91 at one end of the resistance winding 90 is connected through a fixed resistor 132 to the input of the power amplifier 128 and the terminal 92 is connected through a fixed resistor 134 to the input of the power amplifier 130. It may thus be seen that the resistances in the input circuits to a pair of output or power amplifiers 128 and 130 vary inversely as the wiper element 98 moves along the resistance winding 90.

The output of the amplifier 130 drives the actuator 135 of the valve 106 and the output from the amplifier 130 drives the actuator 136 of the coolant control valve 110. The circuit parameter and more particularly the value of the resistor 132 is selected so that when the wiper element 98 is between the midpoint of the resistance element 90 and the terminal 92, the valve 106 is closed. As the wiper element 98 moves from the midpoint toward the terminal 91, the valve opens proportionally allowing steam to be introduced into the heating coil 104 at a rate proportional to the position of the wiper element 98 along the resistance coil 90. The value of the resistor 134 is selected so that when the wiper element 98 is between the midpoint of the resistance element 90 and the terminal 91, the coolant control valve 110 is also closed. As the wiper element 98 moves from the midpoint toward terminal 92, however, the valve 110 opens proportionally allowing the coolant to be introduced to the cooling coil 108 at a rate proportional to the position of the wiper element 98.

Referring again to FIG. 8, the circles of the locations A through K represent the position of the pivot magnet 59 and the adjacent arrows indicate the angular orientation of the overall magnet assembly at that particular location along the curve. Accordingly, the head of each of the arrows or vectors corresponds in position to that of the tracer magnet assembly 75. The angle θ represents the angle between the wiper element 98 and the Y axis of the X–Y plotter. Accordingly, when θ is equal to 0, the wiper element 98 is closest to the terminal 91 and the valve 106 is wide open. When θ is equal to 90°, the wiper element 98 is midway between the ends of the resistance coil 90 and therefore both of the valves 106 and 110 are closed. When θ is greater than 90°, the wiper element 98 is closer to the terminal 92 than the terminal 94 and, therefore, the coolant control valve 110 is opened. When θ is equal to 180 degrees, the coolant control valve 110 is wide open.

By way of example, consider that the process begins at time A, as shown in FIG. 8, and that the temperature of the bath 103 is equal to the desired temperature at that time which may, for example, be room temperature. The pivot and tracer magnet assemblies thus lock onto the cable 34 and have an angular position of 90 degrees whereby both of valves 106 ad 110 are closed and the temperature of the bath remains constant.

At time B, the tracer magnet 75 detects a forthcoming increase in temperature since it is located in an advanced position along the X axis, this indication is represented by a value of θ less than 90 degrees causing the wiper element 98 to move toward the terminal 91. The valve 106 thus begins to open introducing heat into the vessel 100. If the control system is calibrated to the inherent response lag in the system, the pivot magnet assembly 59 will closely follow the curve of the cable 34. If, however, for some reason the system response should be too rapid, the temperature of the bath will rise above the desired value and the pivot magnet assembly 59 will thus rise above the curve. Since the tracer magnet assembly 75 remains locked to the cable 34, the angle θ increases and the steam valve is throttled down to decrease the flow of steam into the coil 104.

At time C, the circuit continues to indicate a required steep temperature rise and the angle θ remains small so that the control valve 106 is nearly fully opened.

At time D, the circuit senses a forthcoming decrease in the temperaature change rate so that the value of θ is decreased and the valve 106 is throttled down accordingly.

When time I is reached, the tracer magnet 75 senses a forthcoming decrease in the temperature and thereby opens the valve 110 so that the coolant fluid passes through the cooling coil 108 to decrease the temperature of the bath 103.

It will thus be seen that the error signal developed in the follower unit 12 is proportional to the slope of a chord drawn between the instantaneous position of the variables X and Y on the X–Y plotter and the position which will be desired at some predetermined distance in the future. By matching the response time lag of the controller to the natural lag of the system, proportional damping is achieved, thereby substantially eliminating hunting in the system.

In the illustrated embodiment of this invention, the magnetic circuit in the follower unit 12 is completed through the magnetic cable 34 and more particularly by the portion of the cable 34 disposed between the magnetic elements 62 and 78. In order to maximize the flux density in the surfaces of these elements which face toward the cable 34, such faces are dimensioned to correspond to the width of the cable. In applications where the pivot magnet asembly 58 may not always be positioned over at least a portion of the cable, then it is preferable to shape the face 64 in the form of an arc concentric with the center of the portion 79 of the element 78. The width of the arc in the radial direction may be approximately equal to the thickness of the cable 34. Accordingly, the flux density in the air gap between the member 62 and the cable 34 is maximized, and the length of the air gap is reduced when the magnetic assembly 58 is not over the cable.

While the present invention has been described in connection with a particular embodiment thereof, it will be understood that many changes and modifications of this invention may be made by those skilled in the art without departing from the true spirit and scope thereof. For example, the cable 34 may be replaced with magnetic member printed on a substrate, or the curve may be drawn directly on the sheet 30 with magnetic ink. Also, the member 62 may be generally L-shaped with a depending portion offset from the axis along which the rods 14 and 16 intersect without departing from the invention.

Accordingly, the appended claims are intended to cover all such changes and modifications as fall within the true spirit and scope of the present invention.

What is claimed is:

1. A controller for providing a control signal proportional to the difference between the value of a first variable and the desired value of said variable in relation to an anticipated value of a second variable, said first and second variables having a predetermined mutual relationship, comprising means for plotting a two-dimensional, planar curve corresponding to the predetermined relationship between said variables, means positioned relative to said curve in accordance with the actual values of said variables for developing said control signal, said last named means including an arcuate resistance element mounted concentric with an axis, a wiper element movable across said resistance element to select resistance values between the wiper element and the ends of said resistance element corresponding to the position of said wiper element on said resistance element, actuator means responsive to the slope of a straight line extending between the position on said curve representative of the actual values of said variables and a position representative of an anticipated desired relationship between said variables for rotating said resistance and wiper elements relative to one another in proportion to the value of said slope, said means for plotting including a cord of magnetic material and means for maintaining said cord in the shape of said curve, and said actuator means further including means for establishing a magnetic circuit having poles rotatably mounted on said axis, and spaced from each other longitudinally of the cord to define an air gap in proximity to said cord, whereby said magnetic circuit rotates about said axis to maintain predetermined rotation between said poles and said cord.

2. A controller as set forth in claim 1 wherein said air gap is substantially equal to the length of said straight line and extends from approximately said axis.

3. A controller as set forth in claim 1 wherein said wiper element is formed of magnetic material and constitutes a part of said magnetic circuit.

4. A controller as set forth in claim 1 wherein said cord is a permanent magnet polarized in the direction of the length thereof.

5. A controller as set forth in claim 1 wherein said magnetic circuit comprises a permanent magnet.

6. A controller as set forth in claim 1 wherein said means for plotting further includes a rigid sheet provided with a plurality of apertures arranged in rows and columns,
a plurality of pegs removably positionable in said apertures and each having a groove in the top thereof for receiving said cord, and
a thin non-magnetic sheet disposed over a rigid sheet in proximity to said cord.

7. A controller as set forth in claim 1 comprising a first frame and a second frame, and hinge means hingedly connecting said frames together,
said sheets being respectively mounted in said frames.

8. A magnetic curve follower comprising
a housing,
an arcuate resistance element mounted in said housing,
a conductive ring mounted in said housing concentric with said element,
a wiper element formed of magnetic material having a thin conductive layer thereon,
said wiper element having a generally circular first end adapted to rest and roll on said ring and a circular other end adapted to rest and roll on said resistance element,
a magnetic assembly rotatably mounted in said housing beneath said resistance element and having an air gap defined by a first pole piece disposed beneath said ring and a second pole piece disposed beneath said resistance element,
said air gap having an effective length equal to the distance between said ends of said wiper element
whereby said wiper element rolls on said resistance element to follow the angular position of said air gap.

9. A magnetic curve follower as set forth in claim 8 wherein the ratio of the radius of said circular first end to the radius of said circular other end is equal to the ratio of the radius of said ring to the radius of said arcuate resistance element.

10. A magnetic curve follower as set forth in claim 8 comprising
a disk mounted in said housing between said resistance element and said magnetic assembly and hermetically sealing said resistance element and said wiper element from the ambient atmosphere.

11. A magnetic curve follower as set forth in claim 8 wherein said magnetic assembly comprises
a first magnetic assembly and a tracer magnetic assembly,
spacer means mounting said pivot and tracer magnetic assemblies a fixed distance apart,
means pivotably mounting said pivot and tracer magnetic assemblies for angular movement around the axis of said pivot magnetic assembly.

12. A magnetic curve follower as set forth in claim 11 wherein
said pivot and tracer magnetic assemblies cooperate to define said air gap and to define a second air gap.

13. A controller comprising the combination of magnetically responsive means for establishing a predetermined curve, a reading device having means supporting it for movement along first mentioned means, said device including first and second magnetic elements spaced longitudinally of said responsive means to establish a magnetic circuit including said responsive means, said magnetic elements being relatively movable about a predetermined axis normal to said first means, said first means providing a flux path between said elements when said elements are approximately aligned therewith.

14. A controller according to claim 13 in which an arm mounted substantially on said axis supports the second said element and provides means for accommodating rotation of the second said element with respect to said arm, both of said elements having poles offset radially with respect to the axis, and a resistor having a contactor of magnetic flux conductive material having portions normally registered with said poles to receive position therefrom, said resistor having fixed contacts between which said contactor provides electrical connection according to its position of engagement therewith.

15. A controller according to claim 14 in which a housing encloses said contactor and the fixed contacts of said resistor and has a partition portion through which a flux path is established in the contactor between said poles.

16. A controller according to claim 14 in which said contactor has rolling surfaces spaced to register with the respective poles, the fixed contacts of the resistor being in sequence along the path of rolling movement of one of said surfaces.

17. A controller according to claim 16 in which one of said rolling surfaces has materially greater radius than the other of said surfaces, whereby the resistor rolls in an arcuate path, the fixed contacts being arranged in arcuate series in the path of rotation of the rolling surface of larger radius.

18. A controller according to claim 13 in which said first mentioned means comprises a flexible member of magnetically conductive material and a plotting board provided with holes in which there are pegs having slots in which said member is trained.

19. A controller according to claim 13 in which said magnetically responsive means comprises a flexible cable having magnetic flux conducting capacity, a support for said means comprising a plotting board having a pattern of openings, pegs positioned in predetermined openings and provided with slots in which said flexible member is trained, a panel overlying said plotting board and constituting a part of the means for supporting the reading device, said reading device including a resistor for which said reading device provides a substantially closed chamber having a bottom wall to which said predetermined axis is substantially normal and having on its upper surface a plurality of electrical contacts in arcuate series about said axis, said resistor further including a rolling contactor disposed generally radially with respect to the axis and having rolling surfaces of different diameter and adapted to enable said rolling contractor to roll across the fixed contacts concentrically about said axis, said contactor being of flux conductive material and said first and second elements having poles offset from the axis and registering with the rolling portions of said contactor whereby to establish a flux path therebetween and to constrain the rolling contactor to assume a position determined by the locations of said poles, the pole locations being relatively variable in the movement of the reading devices with respect to said curve predetermining means and said resistor being adapted to establish a current flow related to the relative angular positions of said elements and hence to the form of said curve establishing means.

References Cited

UNITED STATES PATENTS

| | | |
|---|---|---|
| 2,786,396 | 3/1957 | Wetzel. |
| 3,038,686 | 6/1962 | Rumrill et al. |
| 3,362,021 | 1/1968 | Ma et al. |

FOREIGN PATENTS

| | | |
|---|---|---|
| 635,627 | 1/1962 | Canada. |
| 774,517 | 5/1957 | Great Britain. |

THOMAS E. LYNCH, Primary Examiner

U.S. Cl. X.R.

318—18; 340—177, 187